United States Patent [19]
Petit et al.

[11] Patent Number: 5,766,484
[45] Date of Patent: Jun. 16, 1998

[54] DISSOLVED GAS FLOATATION DEVICE

[75] Inventors: Peter J. Petit, Waukesha; William H. Boyle, Milwaukee; Charles S. Applegate, Brookfield, all of Wis.

[73] Assignee: Envirex Inc., Waukesha, Wis.

[21] Appl. No.: 657,519

[22] Filed: Jun. 3, 1996

[51] Int. Cl.$^6$ ........................................................ C02F 1/24
[52] U.S. Cl. .............................. 210/703; 210/221.2
[58] Field of Search ........................ 210/703, 221.2, 210/221.1

[56] References Cited

U.S. PATENT DOCUMENTS

| | | |
|---|---|---|
| 3,623,608 | 11/1971 | Waterman . |
| 3,773,179 | 11/1973 | Hurst . |
| 4,067,813 | 1/1978 | Pielkenrood . |
| 4,113,629 | 9/1978 | Pielkenrood . |
| 4,160,737 | 7/1979 | Pielkenrood . |
| 4,216,085 | 8/1980 | Chittenden . |
| 4,253,965 | 3/1981 | Pielkenrood . |
| 4,344,845 | 8/1982 | Pielkenrood . |

FOREIGN PATENT DOCUMENTS

| | | |
|---|---|---|
| 47-11699 | 10/1969 | Japan . |
| 2093443 | 9/1982 | United Kingdom . |

OTHER PUBLICATIONS

Ellis, M.M. and Fischer P.W. –"Clarifying Oilfield and Refinery Waste Waters by Gas Flotation", Journal of Petrolevum Engineers –Apr. 1973, pp. 426–430.

Eppler B., "Flotation a/s modernes Verfahren in industriellen und kom–munalen Kläranlagen", 3R International, Apr., 1993 pp. 210–215.

Purec Dissolved Air Flotation Systems, 12 pages.

Primary Examiner—Thomas M. Lithgow
Attorney, Agent, or Firm—Michael, Best & Friedrich

[57] ABSTRACT

A dissolved gas flotation system for treatment of wastewater or contaminated water and having an improved flow pattern wherein the subnatant discharge outlet and the inlet distribution structures are located adjacent one another. Such a structural design takes advantage of the fluid flow patterns within the tank to maximize the effect of the air bubbles in separating solids from the fluid.

17 Claims, 1 Drawing Sheet

DISSOLVED GAS FLOATATION DEVICE

FIELD OF THE INVENTION

The present invention relates to wastewater treatment tanks utilizing dissolved gas flotation technology to separate flocculated solids or immiscible liquid from a contaminated liquid. More particularly, the invention utilizes a treatment tank employing dissolved gas flotation wherein the inlet and the outlet are placed adjacent to one another in the tank.

BACKGROUND OF THE INVENTION

Although dissolved gas flotation ("DGF") technology has been widely used in wastewater treatment, and numerous wastewater treatment tank designs have been developed, there have been no such tanks developed which optimize dissolved gas flotation efficiency and flow of wastewater within the tank.

Traditionally, fluid flow within a DGF tank has consisted of flow within a rectangular tank from one end of the tank to the opposite end. During DGF separation of wastewater or other contaminated fluids, a suitable water stream is pressurized and saturated with air. Then, as the air saturated wastewater is released into a DGF tank, it reaches atmospheric pressure and small bubbles form in the liquid. These bubbles mix with the influent wastewater and attach themselves to particulate contaminants or oils in the liquid, causing the contaminants to rise to the surface. The resulting floated sludge can be skimmed from the surface of the liquid.

It is common to utilize DGF separation tanks which are based upon a linear flow with the inlet at one end of the tank and the outlet at the opposite end of the tank. Some manufacturers, such as Purac Engineering, Inc. of Wilmington, Del. have sought to improve the efficiency of this process. Purac Engineering, Inc. has utilized a linear flow DGF tank which introduces the influent at one end of the tank and collects the effluent through a plurality of slotted pipes arranged along the bottom of the tank in an attempt to increase the separation efficiency of DGF separation.

Another manufacturer, Krofta Engineering Corp. of Lenox, Mass., utilizes a circular DGF tank in which the inlet is adjacent the center of the tank. The effluent is collected over the bottom surface of the tank.

Although separation tank manufacturers may remove the floating material at either end of a separation tank, it is common that whenever the floating material is removed from the separation tank at the inlet end of the tank, the upwelling flow disturbs and dilutes the float at the discharge point. Other prior art patents show methods of and apparatus for separating liquids from solids, but none is concerned with a tank of improved configuration wherein the inlet and outlet placement result in marked improvement to the separation process. For example, U.S. Pat. No. 4,367,148 issued to Fulton discloses a method of and apparatus for separating liquid from solids entrained therein, wherein solids, preferably paint particles emanating from a paint spray booth are capable of floating on the liquid. However, in this process dissolved gas is not used, and the inlet and outlet of the tank are positioned in the floor of the tank.

Nowhere is it shown in the prior art a system which is dedicated to the improvement of fluid flow pattern in a DGF tank in order to improve the efficiency of the separation process.

SUMMARY OF THE INVENTION

The present invention includes a DGF system having an improved flow pattern wherein the subnatant discharge outlet and the inlet distribution structures are located adjacent one another. Such a structural design takes advantage of the fluid flow patterns within the tank to maximize the effect of the air bubbles in separating solids from the fluid.

The invention is premised on the recognition that the most ideal situation for operation of DGF separation of contaminants from liquid would be in a batch DGF reactor where there would be no downward flow of liquid. The bubbles would rise to the surface uniformly and separate contaminants from the liquid. Continuous flow reactors cannot have a zero downward flow velocity, but should strive for a uniform downward velocity. If the downward velocity is not uniform, in those areas where velocity is higher than average, the performance of the separation process will be reduced.

The prior art linear reactors or straight-through reactors do not approach the effectiveness of a batch reactor because in a straight through reactor, as shown in FIG. 2, there is a large recirculating body of water located at the center of the tank. This body of water contains few gas bubbles and the influent containing gas bubbles passes over this central body of water and flows directly to the outlet at the opposite end of the tank. The surface water velocity does not decrease but remains uniformly high along the entire length of the tank, and the effective length of time for the bubbles to remove contaminants is short. Much of the volume of the tank is wasted.

In the DGF tank embodying the invention, the influent containing gas bubbles introduced at one end of the tank moves along the water surface toward the opposite end of the tank, and as it moves, clean liquid separates from the surface flow over the length and width of the tank, flowing first downwardly and then along the bottom of the tank back toward the outlet. The gradual separation of clean water slows the surface stream as it approaches the wall of the tank opposite the influent wall. The clean water at the bottom of the tank forms a return current which speeds up along the bottom of the tank toward the outlet. The downward flow of clean water from the surface stream to the return stream is, by virtue of the natural hydrodynamics, relatively uniform along the length of the tank, and at each point or area along the underside of the influent stream along the surface of the tank, the downward velocity of the clean water which peels away from the surface flow is close to the minimum possible, thereby maximizing the effectiveness of the bubbles to remove contaminants and maximizing the use of the entire volume of the tank.

In one preferred embodiment of the present invention, the tank is rectangular and a baffle extends between the inlet and the outlet outwardly and upwardly toward the center of the tank. The baffle is positioned such that the inlet flow of liquid is separated from the subnatant discharge so that the current of the clean subnatant does not mix with the flow of contaminated liquid emanating from the inlet.

It is a primary object of the present invention to provide a DGF separation tank having an inlet and outlet located at the same wall of the tank so as to optimize the flow pattern within the tank.

It is a further primary object of the present invention to provide a DGF tank which is rectangular having a baffle which extends between an inlet and outlet located at the same end of the tank, the baffle extending outwardly and upwardly toward the center of the tank and wherein the baffle is capable of creating an inlet zone which provides for contact of gas bubbles released from depressurized gas saturated liquid with solids or immiscible liquid as well as uniform distribution of flow into the tank and the isolation of turbulence at the inlet zone.

These and other objects and advantages of the present invention can be readily derived from the following detailed description of the drawings taken in conjunction with the accompanying drawings present herein and should be considered as within the overall scope of the invention.

DESCRIPTION OF THE PREFERRED EMBODIMENT

Figure 1:
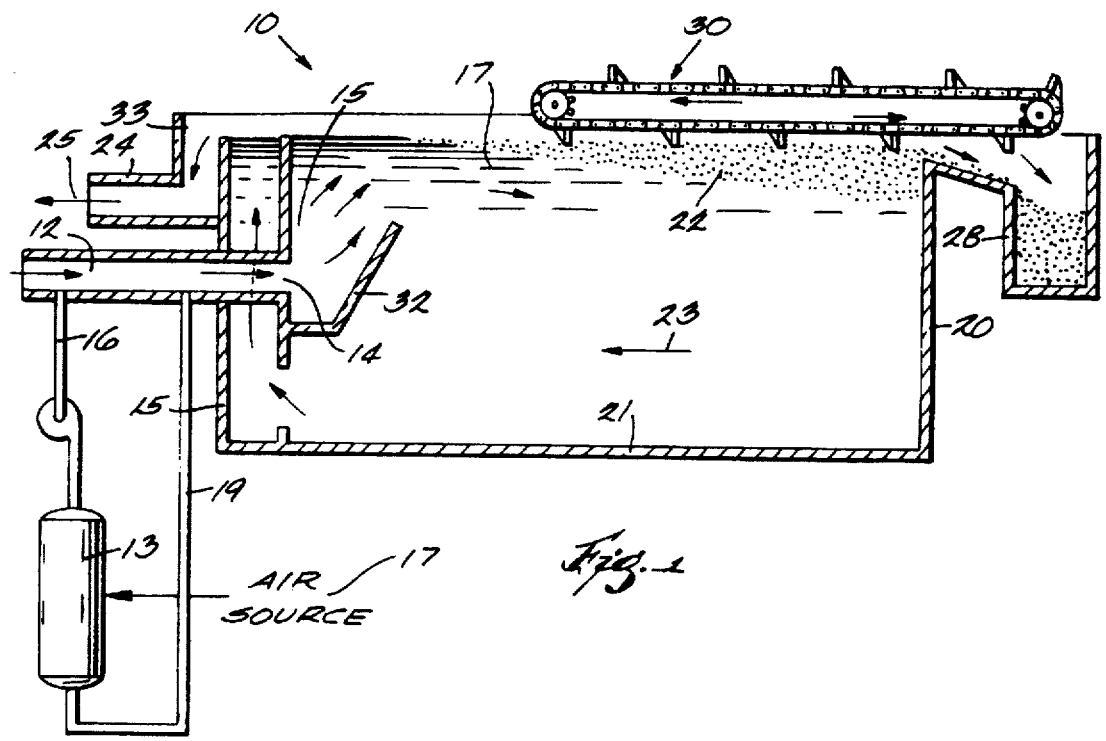
FIG. 1 is a cross sectional side view of an improved DGF tank which is the subject matter of the present invention.
Figure 2:
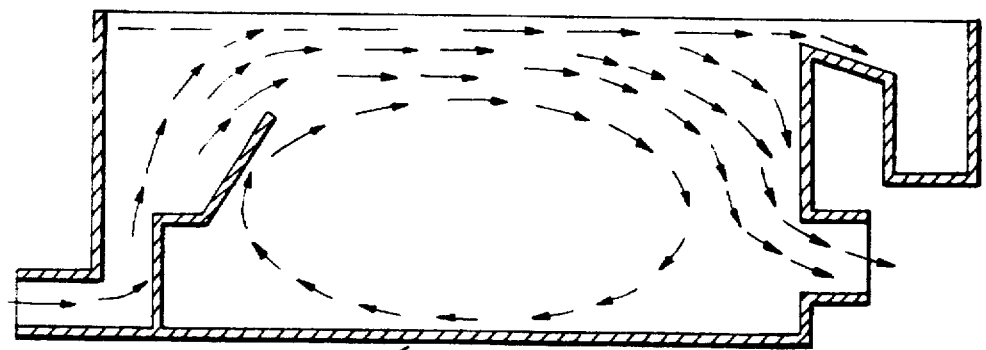
FIG. 2 is a schematic side elevation view of fluid flow in a prior art dissolved gas flotation tank.

FIG. 1 shows a DGF separation tank 10 embodying the invention and wherein the inlet 14 and outlet or subnatant discharge 24 are located on the same wall, proximal wall 15. A baffle 32 extends outwardly and upwardly toward the center of the separation tank 10 from an area adjacent wall 15 and functions to separate subnatant discharge 24 from the inlet zone 15. Wastewater or influent 12 flows through the inlet zone 15 into the separation tank 10. The influent has been pressurized and gas saturated, or alternatively can comprise a gas saturated liquid, such as a recycled portion of the treated effluent, combined with wastewater at the inlet 14. The entrance of wastewater 12 into the inlet 14 can be by any means that distributes the flow uniformly across the width of the tank 10 at the inlet zone 15. Inlet zone 15 provides for contact of gas bubbles released from the depressurized gas saturated liquid with solids or immiscible liquid, distribution of flow into the separation tank and isolation of turbulence at the inlet zone. Although the particular configuration of inlet zone 15 need not take on any particular form, in one preferred embodiment, the inlet zone 15 should provide for unrestricted upward flow.

There are numerous methods of accomplishing the pressurization and gas saturation of the influent liquid which are known to those skilled in the art; however, a common form for pressurizing and gas saturating wastewater is accomplished by delivering at least a portion of the contaminated liquid through a conduit 16 to a pressurization tank 13 in order to gas saturate the liquid going through the tank 13. An air source 17 is provided for supplying air under pressure to the pressurization tank 13. In either case, once the pressurized, gas saturated wastewater is released into separation tank 10 through a conduit 19, the pressure drop results in the formation of bubbles which attach to solid particles or oils in the wastewater and carry such debris to the surface of separation tank 10. The low density of the air in relation to the water causes the mixed influent stream to rise to the surface of the tank 10.

The influent from the inlet zone 15 forms a shallow surface stream 17 flowing across the separation tank 10 toward wall 20 by virtue of momentum and the difference in liquid density between the surface stream 17 and the subnatant water. A floating material zone 22 is created near the top of the separation tank 10. The floating material zone 22 contains a high concentration of contaminants which have been separated from contaminated fluid 12.

In one preferred embodiment of the invention, a chain and flight skimmer 30 is additionally provided to remove the separated contaminants. The skimmer moves the floated solids into a sludge tank 28 for further processing. Although FIG. 1 shows a chain and flight skimmer 30, there are other devices available in the marketplace which are known to those skilled in the art which are suitable for removing floating contaminants from a DGF tank, such as in the present case.

Figure 3:
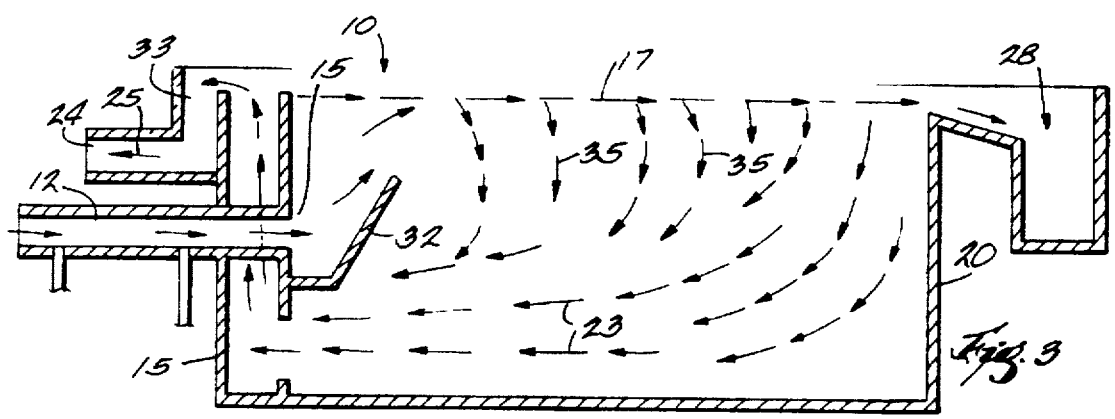
FIG. 3 is a schematic illustration of the fluid flow within the DGF separation tank shown in FIG. 1.

FIG. 3 illustrates schematically the flow pattern of the wastewater as it moves through the tank from the inlet 14 toward the wall 20 and then back to the discharge outlet 24. As the wastewater flows across the tank, portions of the wastewater peel away from the surface current moving toward wall 20 and those portions flow downwardly 35 and then gradually recombine into a bottom stream 23 flowing horizontally back toward wall 15 and through the discharge outlet. While the wastewater 12 flows across tank 10 and downwardly 35, it still contains a substantial amount of saturated gas which continues to release tiny bubbles which further separate the contaminants from the wastewater. These contaminants continue to rise up into the floating material zone 20. As back flow 23 reaches proximal wall 15 near tank floor 21, the subnatant discharge flows under the baffle 32 and is collected in an overflow weir 33. However, any means to remove the clarified liquid at the inlet end of the tank is acceptable. For instance, a perforated pipe located below the baffle 32 could also be used to remove the subnatant discharge 25 from the separation tank 10.

These and other objects and advantages of the present invention can be readily derived from the following detailed description of the drawings taken in conjunction with the accompanying drawings present herein and should be considered as within the overall scope of the invention.

We claim:

1. A process for separating a liquid containing waste materials comprising:

providing a tank with opposed walls, an upper portion and a lower portion, an inlet and an outlet located adjacent the same one of the opposed walls;

introducing influent containing gas bubbles at the inlet;

creating a generally horizontal upper flow stream across the upper portion of the tank from adjacent the inlet towards the wall opposite the inlet;

creating a generally horizontal lower flow stream across the lower portion of the tank from the wall opposite the inlet towards the outlet;

creating a downward flow stream of liquid from the upper flow stream to the lower flow stream, wherein the downward flow stream includes a first portion adjacent the inlet and a second portion adjacent the wall opposite the inlet, and wherein the downward flow velocity of the first and second portions of the flow stream are substantially the same; and removing the liquid from the tank through the outlet.

2. The process of claim 1, wherein the tank has a length defined by the distance between the opposed walls, and wherein the step of creating a downward flow stream includes creating a downward flow stream that extends over at least half the length of the tank.

3. The process of claim 1, wherein the tank includes a baffle extending from between the inlet and the outlet toward the center of the tank, the entire baffle being closer to the wall adjacent the inlet than the wall opposite the inlet, the baffle forming an inlet zone adjacent the inlet, and wherein the step of introducing includes introducing influent containing gas bubbles at the inlet into the inlet zone.

4. The process of claim 3 wherein the step of creating the downward flow stream includes creating a downward flow stream that extends between the baffle and the wall opposite the inlet.

5. The process of claim 3 wherein the tank includes a separation zone extending from the baffle to the wall opposite the inlet, and wherein the step of creating a downward flow stream includes creating a downward flow stream across the separation zone, wherein the downward flow stream further includes an intermediate portion, and wherein the downward flow velocity of the first, second, and intermediate portions of the flow stream are substantially the same.

6. A process for separating solids from wastewater comprising:

provoiding a tank with a floor, at least two opposed wall portions, an inlet and discharge outlet located substantially adjacent the same one wall portion, and providing an inlet zone adjacent the inlet, and wherein the tank has a length defined by the distance between the wall adjacent the inlet and the wall opposite the inlet;

introducing the wastewater containing gas bubbles into the tank at the inlet and allowing it to flow into the inlet zone;

creating a generally horizontal upper flow stream across the upper portion of the tank from the inlet zone towards the wall opposite the inlet;

creating a generally horizontal lower flow stream across the lower portion of the tank from the wall opposite the inlet towards the outlet;

creating a downward flow stream from the upper flow stream to the lower flow stream over at least half the length of the tank, the downward flow stream extending from adjacent the inlet zone to adjacent the wall opposite the inlet, the downward flow velocity of the downward flow stream adjacent the inlet zone being substantially the same as the downward flow velocity of the downward flow stream adjacent the wall opposite the inlet; and removing the liquid from the tank through the outlet.

7. The process of claim 6, wherein the tank includes a separation zone that extends from adjacent the inlet to the wall opposite the inlet and makes up over half the length of the tank, and the step of creating a downward flow stream includes creating a downward flow stream across the entire separation zone.

8. The process of claim 7, wherein the tank includes a baffle extending from between the inlet and discharge outlets and the entire baffle being closer to the wall adjacent the inlet than to the wall opposite the inlet, and wherein the separation zone extends from the baffle to the wall opposite the inlet.

9. The process of claim 6, wherein the tank includes a floating material zone, and a separation zone, and further including the steps of:

separating the wastewater into a supernatant and a subnatant in the mixing and separation zones;

allowing the supernatant to flow into a floating material zone; and allowing the subnatant to flow through the separation zone and to the outlet.

10. A separation tank apparatus for treating wastewater containing floatable material which may be separated from a subnatant fluid comprising:

a tank with first and second spaced apart opposed walls and an upper portion and a lower portion;

an inlet located adjacent the first wall to supply wastewater into the tank; and a gas bubble supply for supplying gas bubbles into the wastewater entering the tank;

an outlet located adjacent the first wall for discharge of subnatant liquid, wherein the tank and the inlet and outlet are positioned with respect to one another such that when the tank is in operation a first horizontal flow stream is created across the upper portion of the tank from the inlet toward the second wall, a second horizontal flow stream is created across the lower portion of the tank from the second wall toward the outlet, and a downward flow stream from the upper flow stream to the lower flow stream is created, wherein the downward flow stream includes a first portion adjacent the inlet and a second portion adjacent the second wall, and the downward flow velocity of the first and second portions of the downward flow stream are substantially the same.

11. The separation tank apparatus of claim 10 wherein the tank has a length defined by the distance between the opposed walls, and wherein the downward flow stream extends over at least half the length of the tank.

12. The separation tank of claim 10, further including:

an inlet zone adjacent the inlet; and a separation zone extending from the inlet zone to the second wall, the separation zone being longer than the inlet zone, and wherein the downward flow stream is created across the separation zone.

13. The separation tank apparatus of claim 10 wherein the tank includes a baffle extending from between the inlet and discharge outlets and the entire baffle being closer to the first wall than to the second wall.

14. The separation tank apparatus of claim 10 further including:

means for discharging the floatable material.

15. A separation tank apparatus for treating wastewater containing floatable material which may be separated from a subnatant fluid having:

a tank with first and second spaced apart walls;

an inlet located adjacent the first wall of the tank to supply wastewater into the tank;

a gas bubble supply for supplying gas bubbles into the wastewater entering the tank;

an outlet adjacent the first wall of the tank for discharge of subnatant liquid;

an inlet zone adjacent the inlet;

a separation zone being longer than the inlet zone and extending from the inlet zone to the second wall, wherein the tank and the inlet and outlet are positioned with respect to one another such that when the tank is in operation a first horizontal flow stream is created across the upper portion of the tank from the inlet toward the second wall, a second horizontal flow stream is created across the lower portion of the tank from the second wall toward the outlet, and a downward flow stream from the upper flow stream to the lower flow stream is created in the separation zone, wherein the downward flow stream includes a first portion adjacent the inlet zone, a second portion adjacent the second wall, and an intermediate portion at the center of the separation zone, and the downward flow velocity of the first, second and intermediate portions of the downward flow stream are substantially the same.

16. The separation tank apparatus of claim 15 further including:

a baffle separating the inlet and outlet and extending toward the center of the tank, the entire baffle being closer to the first wall than the second wall; and wherein the separation zone extends from the baffle to the second wall.

17. The separation tank apparatus of claim 15 further including:

means for discharging the floatable material.

* * * * *